Nov. 3, 1964  A. VALDI  3,155,058
MACHINE FOR THE PLANTING OF RICE SEEDLINGS
Filed Feb. 6, 1961  5 Sheets-Sheet 1
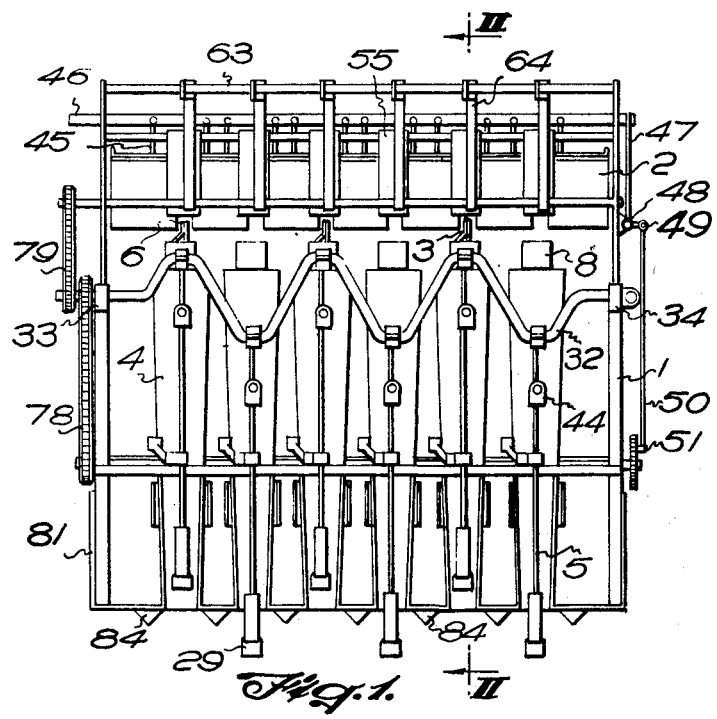
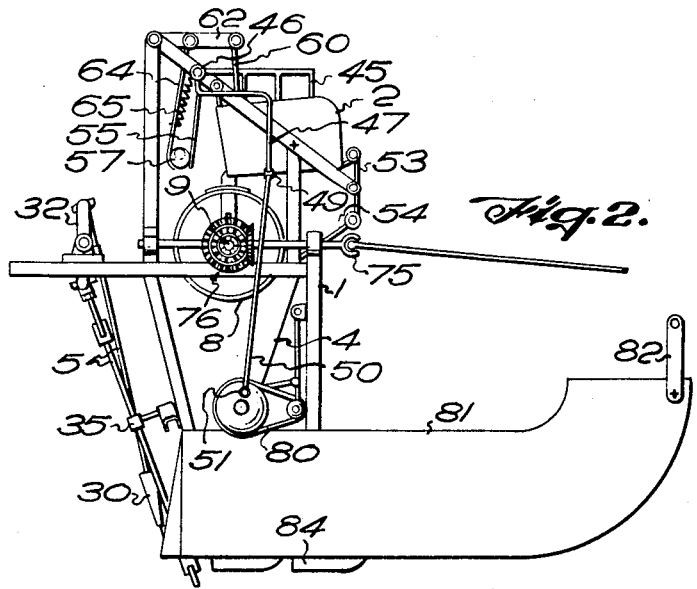
Angelo Valdi INVENTOR:
BY Bierman & Bierman

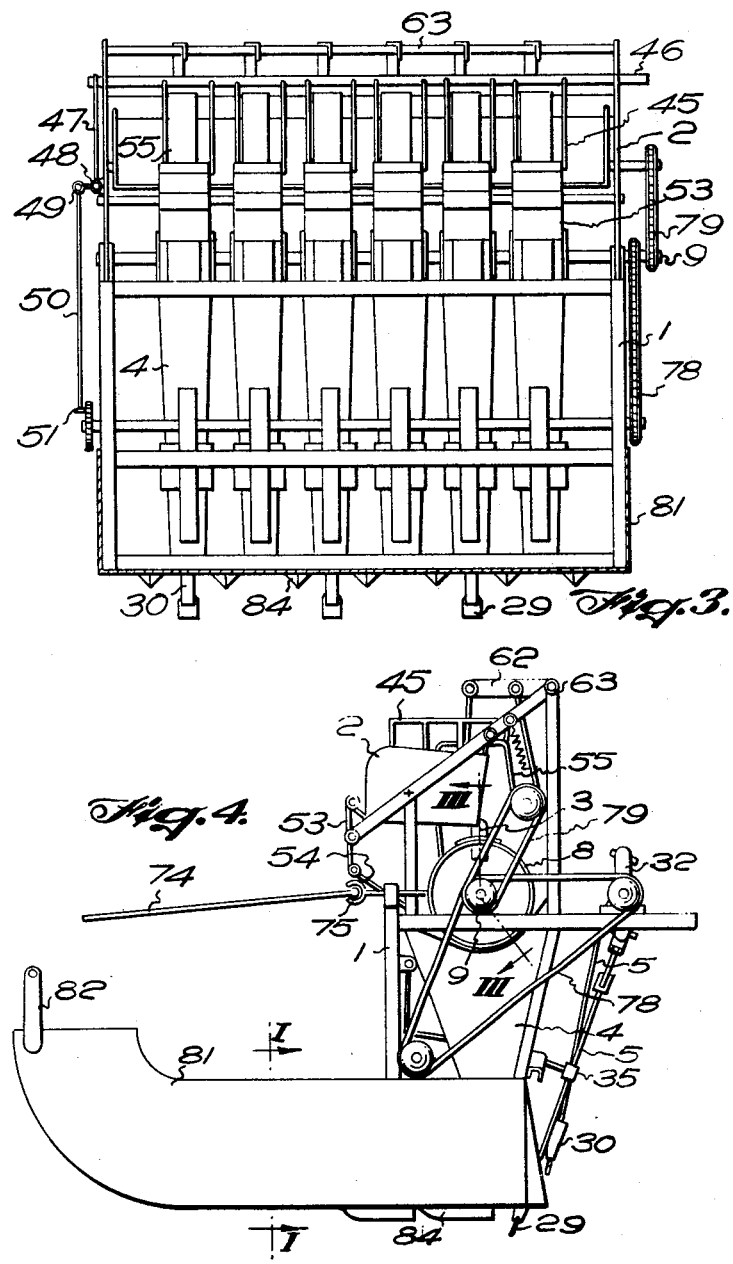

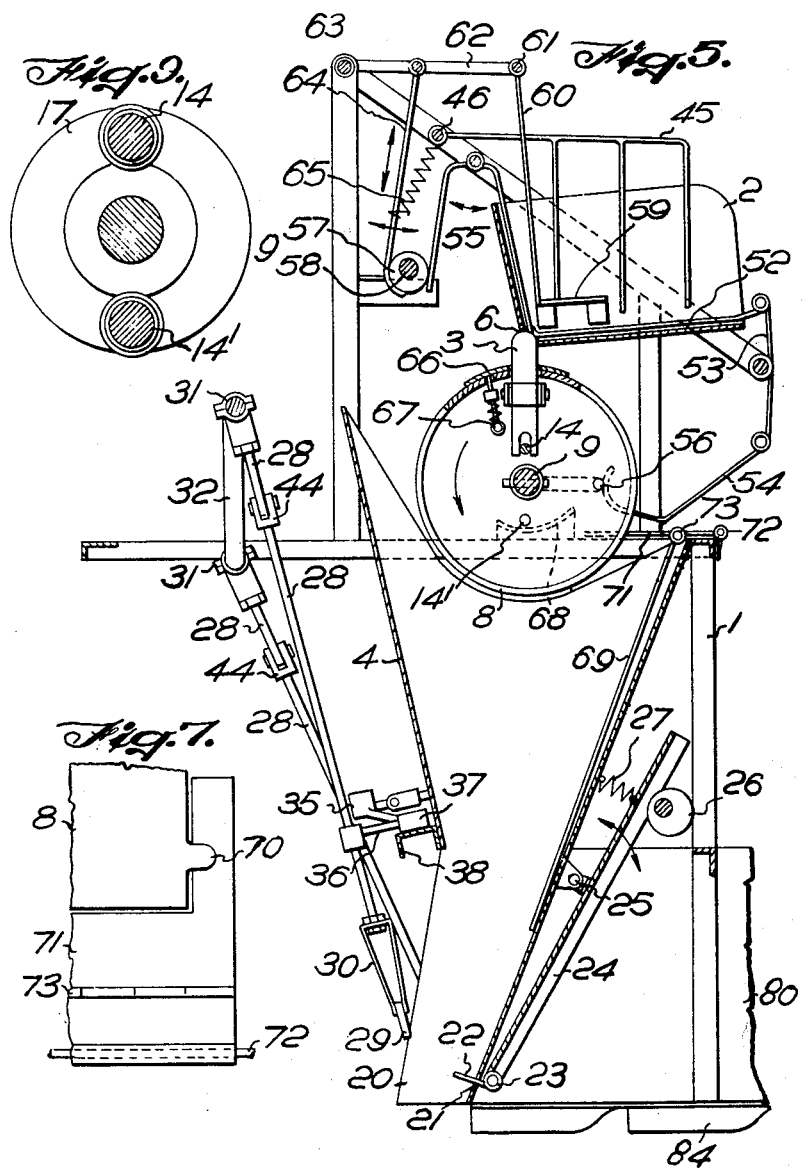

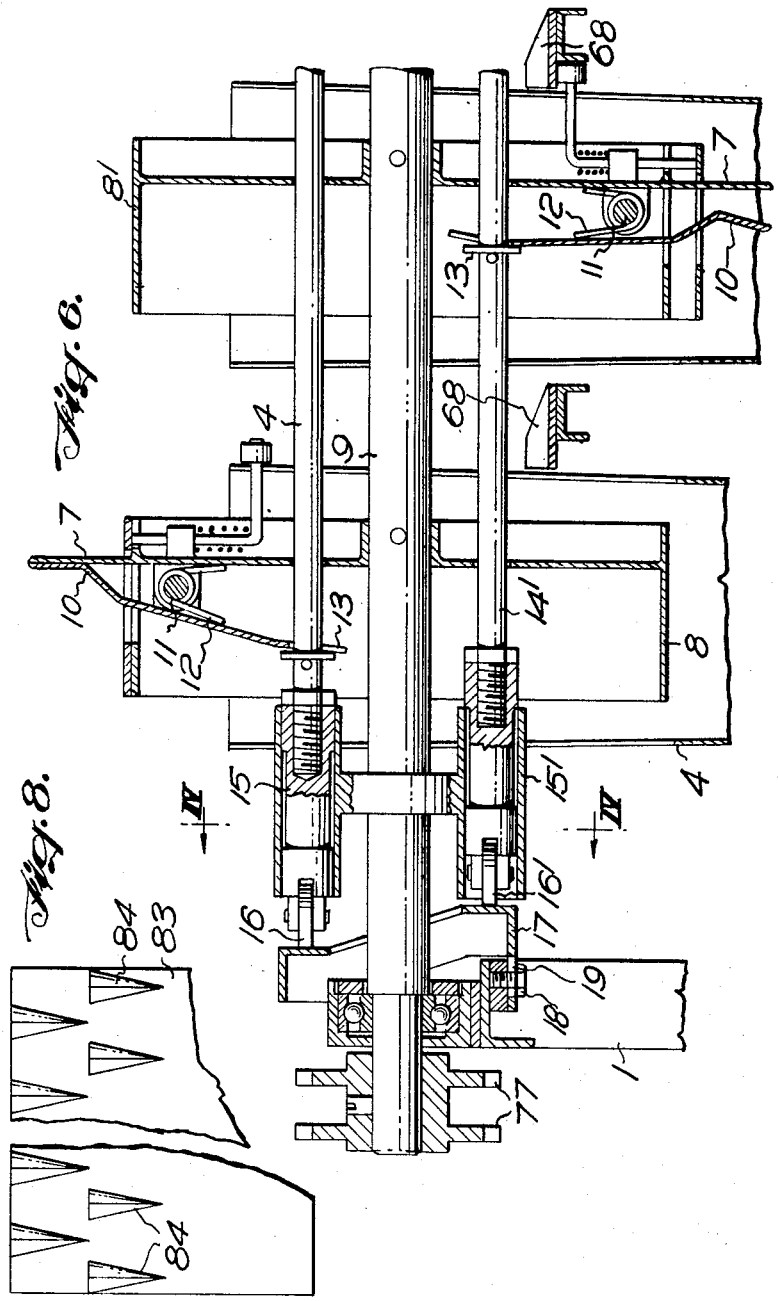

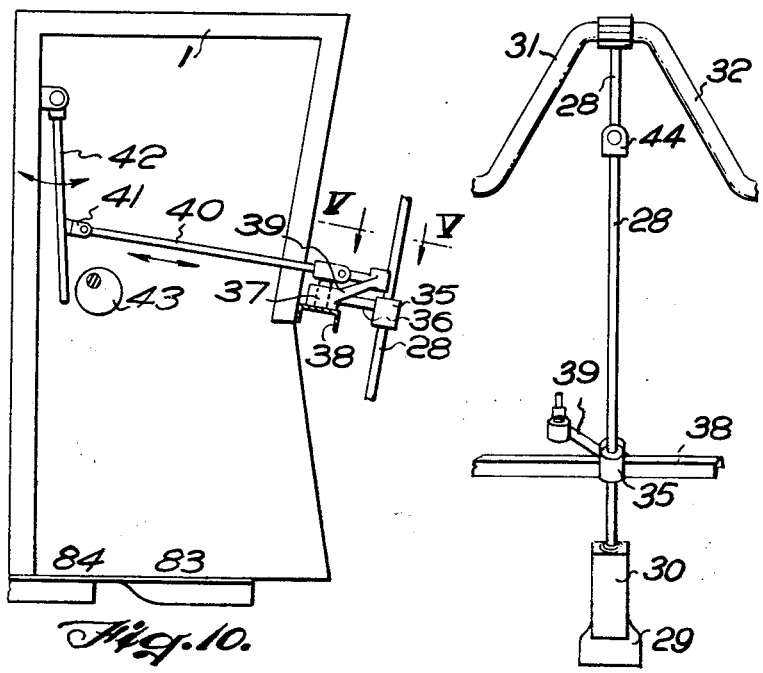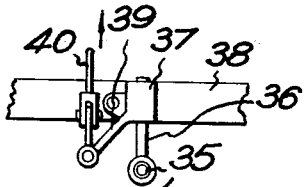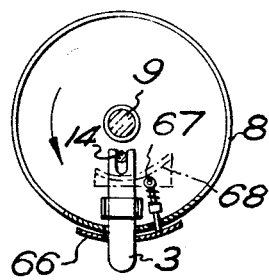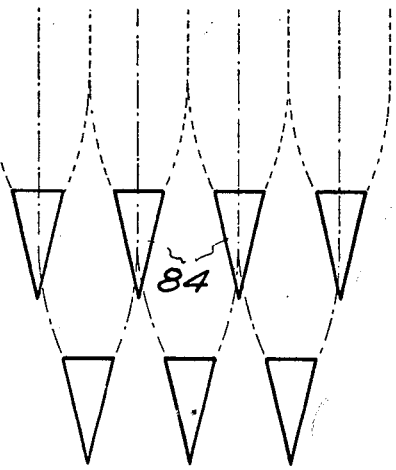

United States Patent Office

3,155,058
MACHINE FOR THE PLANTING OF RICE SEEDLINGS
Angelo Valdi, 19 Via Piave, Pavia, Italy
Filed Feb. 6, 1961, Ser. No. 87,323
7 Claims. (Cl. 111—3)

The invention concerns a machine for the automatic planting of rice seedlings directly into the rice field.

Machines for the automatic transplanting of rice seedlings are already known, but they are not without disadvantages, one of said disadvantages being that the seedlings are not planted efficiently, and therefore their yield is very low.

It is among the objects of the present invention to obviate the disadvantage in question.

The machine is of a type which can be drawn by a tractor, in a manner similar to the operations performed manually, and essentially consists of means for taking hold of seedlings carried in a hopper, conveying such seedlings to the bottom of a chute or funnel to a holding device which releases them whereupon a blade, resiliently connected to a rod, carries them down and plants them in the soil at predetermined intervals, thus exactly reproducing the operations of manual planting.

The machine constructed according to the invention is provided with a hopper having an opening at its lower end; with a rotary gripper device receiving seedlings from the hopper through said opening and dropping them into a chute. The invention contemplates stripper means which insures the separation of each seedling from the gripper device. It also contemplates the provision of a holder at the end of the chute and means for moving such holder and causing the release of the seedling at the required time. The invention further contemplates the provision of a reciprocating planting rod having a lower end operative at the lower end of the chute and adapted to contact each released seedling and implant it in the earth.

The invention will now be described further, by way of example only, with reference to the accompanying drawings illustrating one embodiment thereof and in which:

FIG. 1 is a front elevation of a machine according to the invention;
FIG. 2 is a side elevation of the machine of FIG. 1;
FIG. 3 is a rear elevation of the machine;
FIG. 4 is a side elevation opposite to that of FIG. 2;
FIG. 5 is a section along line II—II of FIG. 1, in a larger scale;
FIG. 6 is a section along line III—III of FIG. 4 in a larger scale;
FIG. 7 is an enlarged plan view of the device for shaking the seedlings down inside the chute;
FIG. 8 is a view from below of the plate with projections;
FIG. 9 is a section along IV—IV of FIG. 6;
FIG. 10 is a side elevation of a device for imparting a semicircular motion to the planting rods;
FIG. 11 is a front elevation of a planting rod; and
FIG. 12 is a section along line V—V of FIG. 10.
FIG. 13 shows diagrammatically the coaction of the segment and cam follower, and
FIG. 14 is a sectional view showing the interaction of the segment, cam and follower.

The machine consists essentially of a frame 1 bearing a hopper 2, rotating grippers 3, chutes 4, and planting rods 5. The hopper 2, situated at the top, is divided into as many compartments as there are grippers, and each is provided at the bottom with an opening 6. Opposite to each opening 6 is the rotating gripper 3, such gripper 3 comprising a fixed arm 7 fastened to or forming the flange of a drum 8 from which it projects, said arm being fixed to a horizontal main shaft 9, and another or moving arm 10 pivoted at 11 against the fixed arm 7 with a return spring 12 therebetween, the end of the arm opposite to that projecting from the drum 8 being bifurcated at 13 and disposed astride a moving rod 14, the rod 14 being parallel to the shaft 9 and free to slide with a reciprocatory manner in a sleeve 15 fixed to the said shaft 9. One end of the rod 14 is fitted with a roller 16 free to rotate in contact with a disc acting as a face cam 17. The position of the cam 17 is adjustable by means of a screw 18 passing through a slot 19, so that the gripper, during its rotation with the drum, when it comes opposite to the hopper 2, closes and grips the seedlings, and when it comes opposite the chute 4 the rod 14, controlled by the roller 16 in contact with the face cam 17 moves in such a way as to cause the gripper 3 to open.

Below each of the grippers rotating with the drum 8 is a funnel-shaped chute 4, the tapered lower portion 20 of which is open at the front to permit free passage of the flexible planting rod 5, and is provided with a slot 21 at the bottom through which a holding device penetrates to project into the inside of the chute 4 in an almost horizontal position. Said holding device consists of a strip 22 hinged at 23 to a lever 24, the latter being pivoted at 25 and operated by a cam 26 rotated by belt 78 and a pulley on shaft 26', as shown by the double arrow (FIG. 5), the movement of the lever 24 being synchronized with that of the planting rod 5. The pivoted lever 24 is maintained in contact with the cam 26 by a spiral spring 27.

The planting rod 5 consists of a shank 28 (FIG. 5) to the bottom end of which is fixed a blade 29 of semi-rigid material (for example proofed cloth) with leaf springs 30 between said shank and blade. The rod 5 is provided, at the top, with a crankshaft bearing 31 through which passes the journal of a crankshaft 32, supported by bearings 33 and 34 at the ends in the frame 1. The shank 28 has a reciprocating motion imparted to it by the rotation of the crankshaft 32 for bearing down and planting the rice seedlings, and a semi-circular motion during its ascent to keep it clear of the seedlings already planted. This shank 28 slides in a guide bush 35 supported by a bolt 36 perpendicular thereto which, in its turn, slides in a support 37 bolted to a crossbar 38 of the frame 1. From this support projects an arm 39 to the end of which is bolted a tie rod 40, pivoted in its turn at 41 to a lever 42 actuated by a cam 43 to impart the above-mentioned semi-circular movement to the shank 28, this being also facilitated by a joint 44 provided towards the top of the shank 28.

In order to align the seedlings, a fork 45 is provided in each compartment (FIG. 3) and is capable of a transverse movement by virtue of a shaft 46 directed parallel to the shaft 9 and situated above the hopper 2, the shaft 46 receiving its movement from a bell crank lever 47 pivoted at its angle 48 to the frame 1 and bolted at the end 49 of the other side to a connecting rod 50 actuated by the crank 51.

The seedlings are conveyed towards the opening 6 by means of a shutter 52 (FIG. 5) lying on the bottom of the compartment and actuated by the set of levers 53, 54 and 55, operated by the cams 56 and 57, mounted respectively on the drum 8 and the shaft 58 supported by the frame 1.

The rice seedlings are in their turn pushed downwards towards the gripper 3, into such a position that they can easily be gripped, by a pusher 59 fixed to the end by a long rod 60 bolted at 61 to a projecting lever 62 hinged at 63 to the frame 1, and which is in its turn given an oscillating motion by the above-mentioned cam 57 via the rod 64 (the end of which is curved) fitted with a return spring 65.

To facilitate the dropping of the seedlings from the gripper 3, the drum 8 is provided on its outer circumference with a circular segment 66 constituting a stripper and provided with an opening through which pass the ends of the gripper. This circular segment is connected to a rod carrying a cam follower 67 and has a radial motion during the rotation of the drum 8 owing to the action of the cam follower 67 on the drum when said follower travels on a cam 68 fitted to the frame 1. It functions to strip the seedlings away from the gripper and assure their dropping into the chute. A return spring serves to urge the segment 66 into contact with the circumference of the drum 8.

On the rear inside wall of the chute 4 is fixed a plate 69 which is intended to drop to ensure the downward movement of the seedlings. The reciprocatary motion of this plate is produced by a projection 70 from the circumference of the drum 8, devised to raise a horizontal strip 71 (FIG. 7) pivoted at 72 to the frame 1 and bolted at 73 to the said plate 69, at every turn of the drum.

In view of the fact that the machine, in the preferred form, is generally provided with a number of grippers arranged in parallel side by side disposition and staggered at 180 deg., from each other, one half of these are actuated by a rod 14 and the other half by another rod 14' (FIG. 6) parallel to the first and to the main shaft; similarly the planting rods 5 are mounted in staggered fashion on the crankshaft 32.

The machine is driven by the driving shaft 74, fitted with a ball joint 75, from a tractor (not illustrated) which transmits the movement via a bevel geared gearbox 76 to the main shaft 9, to which, in addition to the drums 8, grippers 3, planting rods 5, rollers 16, 16' are also keyed the gears 77, which by means of the transmissions 78, 79 and 80, impart the motion to the secondary shafts for operating the whole machine. The main shaft 9 carries a pulley 9a and belt 78 extends around the same and passes around a pulley 32a operative to drive the crankshaft 32. Pulley 9a is a double pulley and it also takes belt 79 which passes around the pulley 79a which rotates the cam 57. Instead of pulleys and belts, chains and sprockets can be used.

The machine is mounted on the end of an open box or bin 81, the front end being curved and having affixed thereto the brackets 82 for fastening the unit to the tractor. This box provides a platform for the operators and also accommodates the seedlings to be transplanted, such seedlings being manually transferred to hopper 2 for planting.

Below the box or bin 81 is fitted a large plate 83 (FIG. 8) with two rows of projections 84 and 84', one row being staggered in relation to the other, the projections being of triangular section and one row 84 being intended to cut small furrows whilst the other row 84' ridges alternate with rows 84 and provide the soil necessary for covering the seedlings with earth, also maintaining the machine in its proper position during transplanting.

From the foregoing, the operation of the machine will be readily understood. The seedlings to be implanted are contained in the hopper 2 and the grippers 3 pick the seedlings up through the hopper outlet 6. The forks 45 are operative in the hopper to align the seedlings therein, and the pusher 59 pushes the seedlings toward the hopper outlet so that they can be easily engaged by the gripper. As the gripper carrier or drum 8 is rotated, the transported seedlings are brought to a position over the chute 4 into which they are dropped when released by the separation of the movable gripper finger 10 from the fixed arm 8. The stripper plate 66 engages parts of the seedling while it is positioned over the top of the chute and such stripper serves to strip the seedling away from the gripper and insure its deposit into the chute. The seedlings, thus deposited in the chute, fall to the lower portion thereof where they are held by the holding device 22 until engaged by the blade 29 of the planting rod which carries them down and plants them in the soil at predetermined intervals.

It is obvious that both the number of sets of grippers and drums and also the arrangement of the different mechanisms and the means of actuating them may vary considerably from the above descriptions and the accompanying illustrations to make possible the various practical applications, without, however, departing from the present invention.

I claim:

1. A machine for planting seedlings which comprises a frame, a hopper for seedlings at the upper portion of the frame, said hopper having an opening at its lower end for the passage of the seedlings, a gripper at said opening for gripping the seedlings, a drum below said opening with means for rotating the same, said gripper being mounted on said drum, means associated with said drum and with the gripper for closing the gripper when it receives a seedling from the hopper and for opening the gripper when the gripper is in position above an outlet chute, a stripper plate mounted on the drum adjacent to the periphery of the drum, said plate surrounding the gripper, means for moving the stripper plate toward the drum on closing movement of the gripper and for moving said plate away from the drum upon the opening of the gripper to cause the stripper plate to engage parts of a seedling held by the gripper and to force the seedlings away from the gripper, an outlet chute located below the drum and adapted to receive the seedlings when they are released from the gripper, a holder at the lower end of the chute to retain the seedlings, means for moving said holder out of the chute and releasing said holder, a reciprocating planting rod on said frame and connected to the chute, the lower end of said rod being operative at the lower end of the chute and adapted to contact said released seedling and implant it.

2. A machine according to claim 1 in which the gripper includes a rotating shaft, the drum being mounted on the shaft and rotating therewith, the stripper plate being located on the outside of the drum, the means for moving the stripper plate toward and away from the drum being cam means, the gripper consisting of co-operating arms for engaging a seedling between them, the first gripper arm extending radially of the drum and being attached to the shaft, the second gripper arm also extending radially of the drum and being pivotally mounted relatively to the first arm, a spring extending between the arms and acting to maintain gripping engagement between the outer ends of the arms, a moving rod disposed parallel to the shaft, a guide sleeve freely mounted on the shaft and supporting the moving rod, an adjustable disc arranged around the shaft and constituting a face cam, a roller supported by the guide sleeve and maintained in contact with the disc, the second gripper arm having a bifurcated end portion straddling the moving rod and moving in company therewith to cause said second arm to execute a pivotal motion to move it away from the other arm and thereby release a seedling.

3. A machine as provided for in claim 1, wherein the stripper plate is of arcuate form and conforms to the periphery of the drum, the gripper includes a fixed arm and a movable arm, with portions of both of said arms projecting through the stripper plate, the means for moving the stripper plate to and from the drum consists of a fixed cam and a cam follower carried by the stripper plate, the cam being effective to move the stripper plate away from the surface of the drum while the movable arm is adapting an open position, and cause it to strip a seedling from the gripper, and the stripper-plate moving means including a spring for bringing the stripper plate toward the surface of the drum after the performance of its stripping action.

4. A machine as provided for in claim 1, including a plate pivotally supported by the chute and overlying a portion of the wall of the chute, the drum having a projection extending from it and contacting with a part of the plate on rotation of the drum to thereby impart an oscillating movement to the plate to assist in the passage of the seedlings down through the chute.

5. A machine as provided for in claim 4, including means for aligning the seedlings in the hopper, said means including a fork arranged within the hopper, a shaft disposed above the hopper and extending parallel to the shaft on which the grippers are mounted, the first-mentioned shaft being adapted to impart lateral motion to the fork, a bell-crank lever connected to the fork, an axis passing through the angle of said lever, and means by which said lever, is caused to execute the required lateral movement for the fork, a box adapted to support machine operators and carry rice seedlings, a first row of projections below said box adapted to cut small furrows and a second row of projections is staggered relation relative to the first row and adapted to ridge said furrows to thereby facilitate the setting of the seedlings in the soil.

6. In a machine for planting seedlings, a hopper containing the seedlings, a rotary shaft carrying a drum, a seedling-gripper carried by the drum and including a first arm extending radially of the drum and having an end part extending beyond the periphery of the drum for engaging a seedling, said first arm being fixed to the shaft, a second arm extending radially of the drum and being pivotally mounted relatively to the first arm whereby said second arm can, by its pivotal movement have one of its ends brought to or away from the extended part of the first arm to enable a seedling to be gripped between the arms or released thereby, spring means for biasing the second arm toward the first arm, a moving rod disposed parallel to the shaft, a guide sleeve freely mounted on the shaft and supporting said moving rod, a face cam extending around the shaft, a roller supported by the guide sleeve and maintained in contact with the face cam, the second arm having a bifurcated end portion straddling the moving rod and being adapted to move in company with said rod to thereby cause the second arm to pivot and open or close the gripper means, and a stripper comprising an arcuate segment disposed adjacent to the surface of the drum is the region of the gripper arms and means for moving the stripper radially of the drum.

7. In a machine as provided for in claim 6, including a pivotal plate supported by a wall of the chute, said chute being located below the drum, and a projection extending from the drum whereby said plate is oscillated during rotation of the drum by contact of said projection with a part of the plate to thus assist in the passage of the seedlings down the chute.

References Cited in the file of this patent

UNITED STATES PATENTS

| | | |
|---|---|---|
| 355,478 | Simmons | Jan. 4, 1887 |
| 442,499 | Tucker | Dec. 9, 1890 |
| 519,248 | Elam | May 1, 1894 |
| 1,972,325 | Acasio | Sept. 4, 1934 |
| 2,514,522 | Sheton | July 11, 1950 |
| 2,815,725 | Hanson | Dec. 10, 1957 |
| 2,949,083 | Knowles | Aug. 16, 1960 |

FOREIGN PATENTS

| | | |
|---|---|---|
| 934,023 | France | Jan. 7, 1948 |
| 815,715 | Germany | Oct. 31, 1951 |
| 613,405 | Great Britain | Nov. 25, 1948 |
| 467,116 | Italy | Nov. 27, 1951 |
| 581,249 | Italy | Aug. 23, 1958 |